United States Patent
Isoda

(10) Patent No.: US 8,269,795 B2
(45) Date of Patent: Sep. 18, 2012

(54) IMAGE OUTPUT APPARATUS, CONTROL METHOD, AND COMPUTER-READABLE STORAGE MEDIUM

(75) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 580 days.

(21) Appl. No.: 12/493,068

(22) Filed: Jun. 26, 2009

(65) Prior Publication Data

US 2009/0322792 A1    Dec. 31, 2009

(30) Foreign Application Priority Data

Jun. 27, 2008    (JP) ................. 2008-169522

(51) Int. Cl.
G09G 5/373    (2006.01)
G09G 5/377    (2006.01)
(52) U.S. Cl. ....................... 345/635; 345/670
(58) Field of Classification Search .......... 345/635, 345/660, 667, 670; 715/251, 253, 277
See application file for complete search history.

(56) References Cited

U.S. PATENT DOCUMENTS

| | | | |
|---|---|---|---|
| 7,248,386 B2 * | 7/2007 | Nishi | ............................. 358/1.2 |
| 7,308,155 B2 | 12/2007 | Terada | |
| 2002/0057281 A1 * | 5/2002 | Moroo et al. | ................. 345/668 |
| 2004/0017394 A1 * | 1/2004 | Adachi | .......................... 345/744 |
| 2004/0095587 A1 * | 5/2004 | Brown et al. | ................. 358/1.2 |
| 2008/0186396 A1 * | 8/2008 | Nakajima et al. | ........ 348/333.01 |

FOREIGN PATENT DOCUMENTS

| | | |
|---|---|---|
| JP | 8-339279 A | 12/1996 |
| JP | 2002-77567 | 3/2002 |
| JP | 2002-152497 | 5/2002 |
| JP | 2003-163801 | 6/2003 |
| JP | 2006-042301 | 2/2006 |
| JP | 2006-209409 | 8/2006 |
| JP | 2006-256162 | * 9/2006 |
| JP | 2006-311065 | 11/2006 |

OTHER PUBLICATIONS

Japanese Office Action for Japanese Application No. 2008-169522 dated Apr. 10, 2012.

* cited by examiner

*Primary Examiner* — Jeffery A Brier
(74) *Attorney, Agent, or Firm* — Carter, DeLuca, Farrell & Schmidt LLP

(57) ABSTRACT

The apparatus of the present invention includes a reduction ratio determination unit that determines a reduction ratio in each of a plurality of image data based on a character size included in each of the plurality of image data; a reduction unit that reduces the plurality of image data according to the respective reduction ratio; a layout trial unit that arranges the plurality of reduced image data according to a plurality of layout methods; and a layout determination unit that determines a layout method from the plurality of layout methods based on the number of the plurality of image data arranged.

9 Claims, 19 Drawing Sheets

IMAGE OUTPUT APPARATUS, CONTROL METHOD, AND COMPUTER-READABLE STORAGE MEDIUM

BACKGROUND OF THE INVENTION

1. Field of the Invention

The present invention relates to an image output apparatus, and in particular, relates to an image output apparatus for sequentially arranging and outputting a plurality of images on a single sheet or a single screen.

2. Description of the Related Art

Conventionally, a document output apparatus for reducing a plurality of document pages and arranging and outputting the plurality of reduced document pages on a single sheet of paper is known.

A document output apparatus disclosed in Japanese Patent Laid-Open No. 08-339279 sets the reduction ratio of an image so as not to be less than a predetermined uniform size as a result of the reduction of the smallest size characters contained in a document. At the set reduction ratio, image data, i.e., a page, is reduced and a layout is selected such that the maximum number of reduced pages can be arranged on a single sheet of paper. For a layout, the number of reduced pages to be arranged on a single sheet of paper is, for example, 2 to 9, and an appropriate number is selected from among these.

According to this conventional document output apparatus, a case where characters are too small to see due to the reduction is solved. In addition, this document output apparatus applies a set reduction ratio to all pages, so that it can output a document in a presentable manner.

In a conventional document output apparatus, a character size does not become too small even if a page is reduced and output, and thus, the effect of making documents readable is provided. However, the number of sheets to be printed may not be reduced.

More specifically, in the prior art, the demand that the printing cost be reduced by reducing the quantity to be printed while maintaining a readable character size on documents at a minimal level could not be realized.

SUMMARY OF THE INVENTION

The present invention provides an image output apparatus and an image output method for reducing and outputting a document while maintaining a character size that allows the document to be read, as well as reducing the number of printouts.

According to an aspect of the invention, an apparatus is provided that includes a reduction ratio determination unit that determines a reduction ratio for each of the plurality of image data based on a character size included in each of the plurality of image data; a reduction unit that reduces the plurality of image data according to the respective reduction ratio; a layout trial unit that arranges the plurality of reduced image data according to a plurality of layout methods; and a layout determination unit that determines a layout method from the plurality of layout methods based on a number of the plurality of image data arranged.

Further features of the present invention will become apparent from the following description of exemplary embodiments with reference to the attached drawings.

DESCRIPTION OF THE EMBODIMENTS

Hereinafter, various embodiments of the present invention will be explained with reference to the attached drawings.

A first embodiment of the present invention provides a printer driver that converts data received from an application to data printable by a printer.

Figure 1:
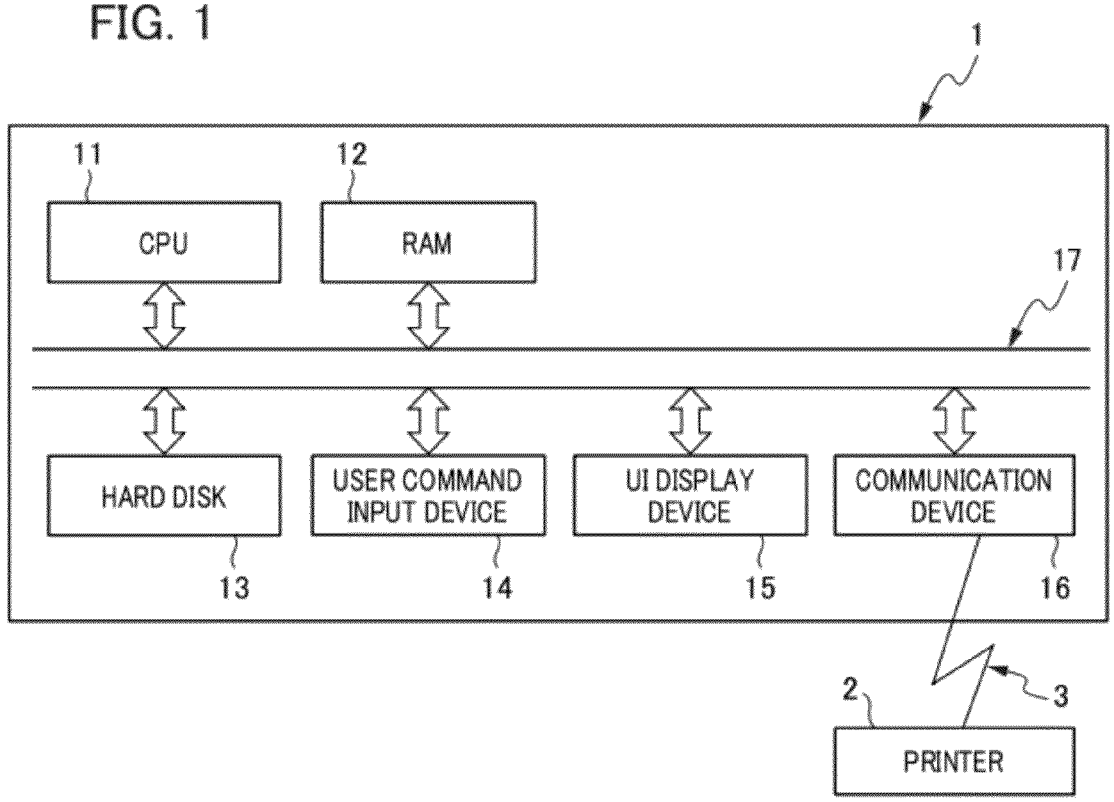
FIG. 1 is a view showing a document output apparatus according to a first embodiment of the present invention.

FIG. 1 shows a configuration of a document output apparatus according to a first embodiment. The document output apparatus according to the present invention includes a personal computer 1 and a communication line 3 that connects the personal computer 1 with a printer 2. Various applications and printer drivers are installed on the personal computer 1. The communication line 3 enables the exchanging of data between the personal computer 1 and the printer 2.

The personal computer 1 includes a CPU 11, a RAM 12, a hard disk (hereinafter referred to as "HDD") 13, a user command input device 14, an UI display device 15, a communication device 16, and a main bus 17 connecting these components together.

The CPU 11 controls the entire document output apparatus of the present invention. The RAM 12 provides a work area for the CPU 11. The HDD 13 provides the program of the present invention, stores various setup information, and records files (may be NVRAM or the like). For example, the printer driver which executes processing of the present application is stored on the HDD 13. A user performs various settings via the user command input device 14 in a GUI (Graphical User Interface) environment. The UI display device 15 displays the GUI (Graphical User Interface). The communication device 16 is responsible for communication with a printer.

Figure 2:
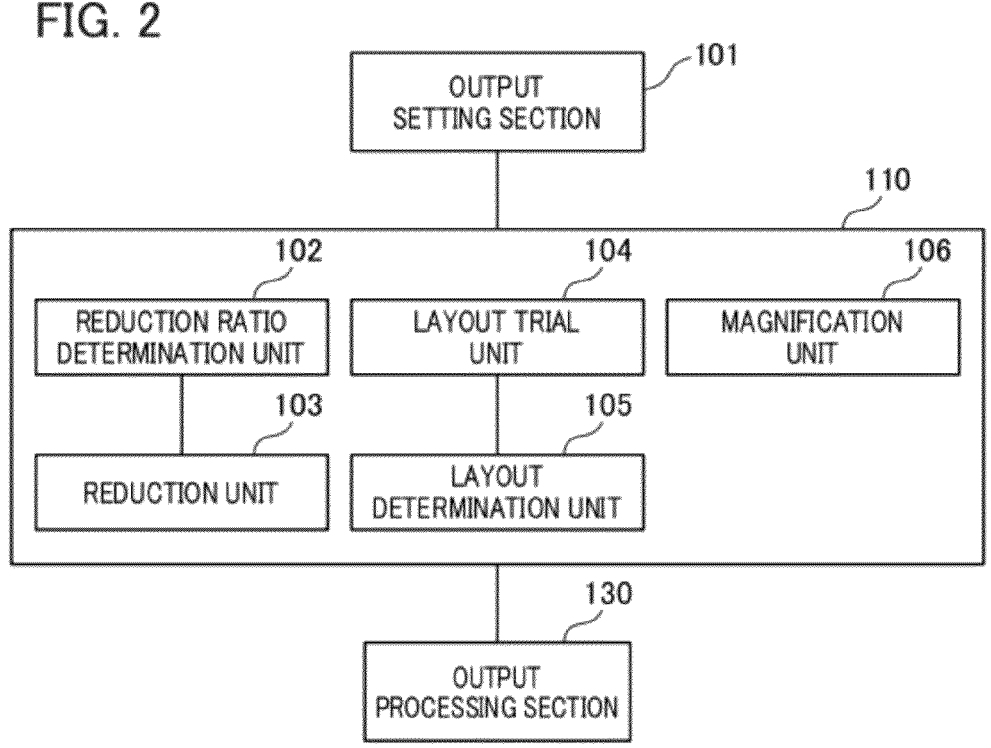
FIG. 2 is a block diagram showing a configuration of the printer driver of the present invention.

FIG. 2 shows a block diagram of a printer driver for the document output apparatus according to the first embodiment. The printer driver consists of an output setting section 101, a margin reducing module 110, and an output processing section 130. The output setting section 101 sets the selection for normal printing or margin reducing printing and the settings for the character size or the like. The margin reducing module 110 performs the margin reducing printing to be described later on the basis of the settings provided by the output setting section 101. The output processing section 130 converts image data received from the margin reducing module 110 to printing data, and transmits it to a printer.

As used herein, "margin reducing" refers to an approach which reduces a plurality of images (pages in the first embodiment) utilizing the margins of a sheet and successfully arranges them on a single sheet. As used herein, "margin reducing printing" refers to printing an image after completion of the margin reducing processing.

The margin reducing module 110 consists of a reduction ratio determination unit 102, a reduction unit 103, a layout trial unit 104, a layout determination unit 105, and a magnification unit 106.

The reduction ratio determination unit 102 extracts input image data, for example, the character size contained in a page, and determines the reduction ratio of the page from the character size. The reduction ratio of the present application refers to a coefficient to be applied to each page. For example, a reduction ratio of 70% means that the size of the page is reduced to 70% of its original size. The reduction unit 103 reduces the page using the reduction ratio determined by the reduction ratio determination unit 102. The layout trial unit 104 arranges the reduced page using a plurality of layout methods. The layout determination unit 105 determines a layout method using the layout result having a plurality of patterns on the basis of, for example, the number of a plurality of pages arranged on the surface of one sheet. An exemplary determination method includes a process of determining a layout method by which the maximum number of pages can be arranged. The printer driver produces printing data (printer description language) using the image data of the page arranged by the determined layout method, and outputs it to a printer. The CPU 11 loads the printer driver from the HDD 13 to the RAM 12, and then executes the flowcharts of FIGS. 3, 5, 6, and 8.

Figure 3:
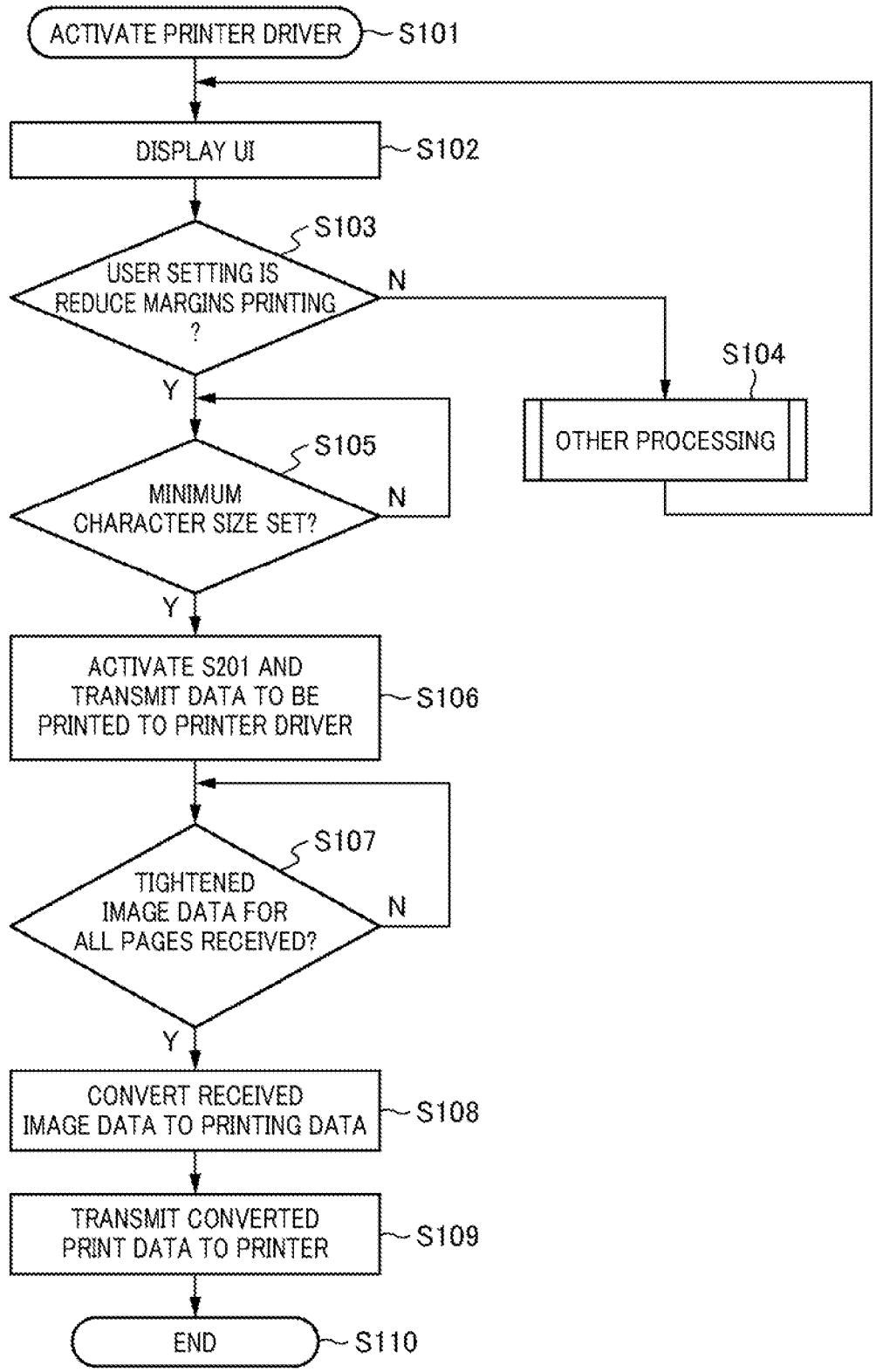
FIG. 3 is a flowchart showing the operation of the printer driver according to the first embodiment.
Figure 4:
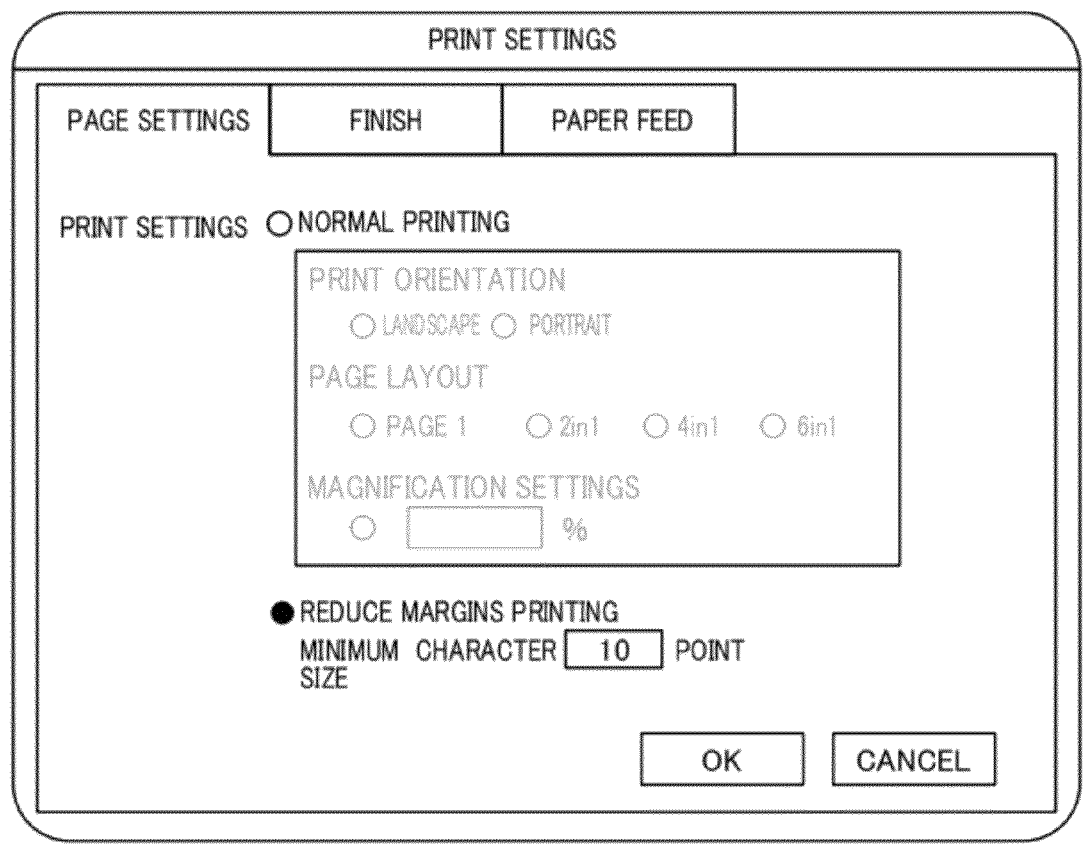
FIG. 4 is a view showing a UI screen for print settings of the first embodiment.

FIG. 3 is a flowchart showing an example of operation of the printer driver in accordance with the present invention. Firstly, the CPU 11 activates the printer driver (step S101). When the running application issues a print request to the printer driver, the output setting section 101 displays a screen for performing print settings as shown in FIG. 4 on the UI display device 15 (step S102). In the print settings, normal printing and margin reducing printing should be mutually exclusive settings.

Next, the output setting section 101 judges whether or not the user's selection, which has been input from the user command input device 14, is margin reducing printing (step S103). If the input is not margin reducing printing, the printer driver performs the other printing process (step S104). If the input is margin reducing printing, the output setting section 101 waits for the smallest character size to be input from the user command input device 14 (step S105). In this embodiment, a ten point character size is input using the setup screen of FIG. 4. When the user inputs the smallest character size, the margin reducing module is activated and transmits image data to be printed together with the input smallest character size to the output processing section 130 (step S106).

The output processing section 130 waits to receive all pages of the image data subjected to the margin reducing processing (step S107). When the output processing section 130 has received all pages of the image data subjected to the margin reducing processing, the received image data is converted to printing data according to a known method (step S108). The output processing section 130 transmits the converted printing data from the communication device 16 in the personal computer 1 to the printer 2 via the communication line 3 (step S109), and terminates its process (step S110). When the printer 2 receives printing data, the printer 2 prints it in accordance with its content.

Figure 5:
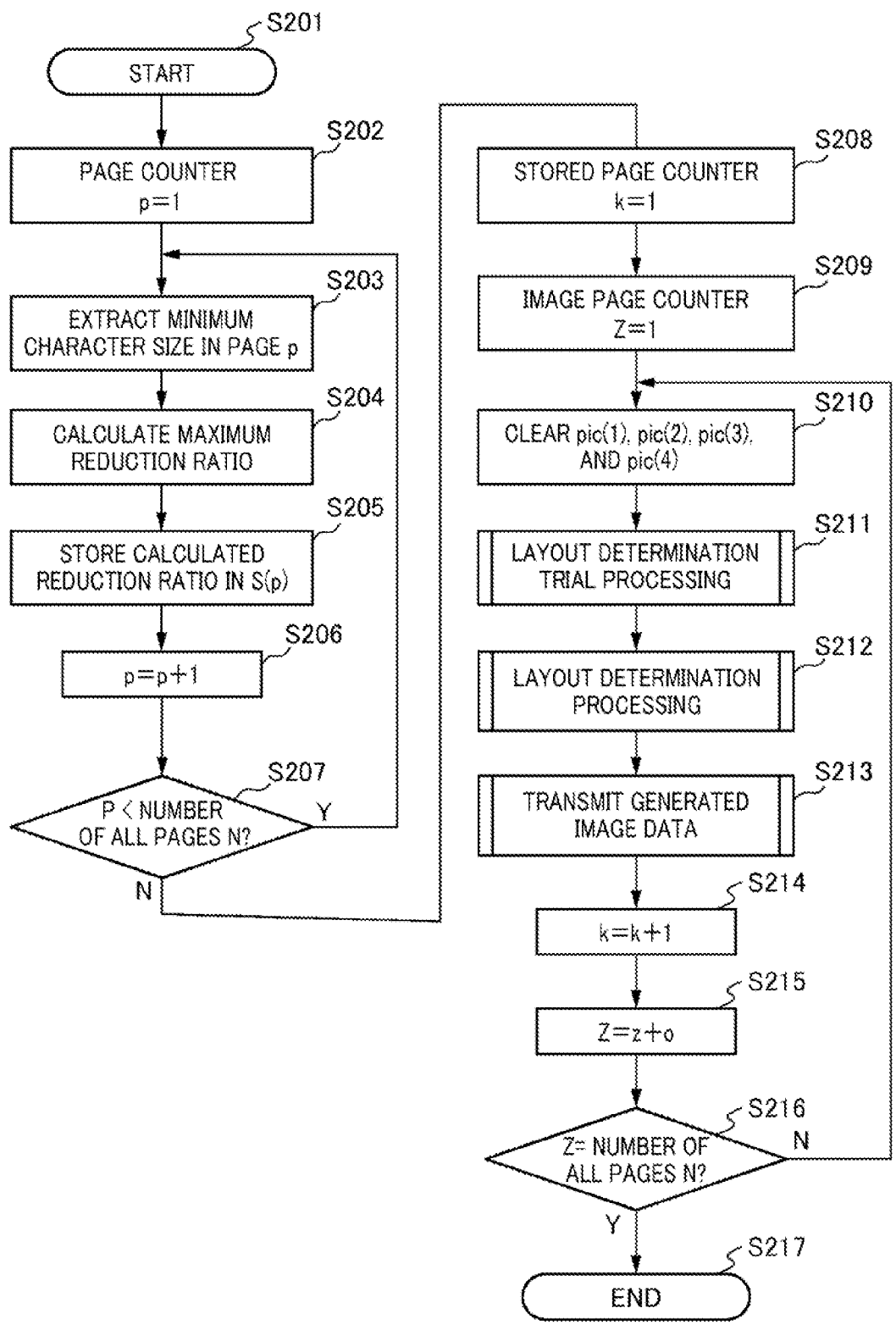
FIG. 5 is a flowchart showing the operation for carrying out the margin reducing processing of the first to third embodiments.

FIG. 5 is a flowchart showing the operation of the margin reducing module 110 that performs the margin reducing processing.

When the margin reducing module 110 is activated (step S201), the reduction ratio determination unit 102 initializes the page counter p to 1 (step S202). The reduction ratio determination unit 102 extracts the smallest character size contained in page p of the received image data (step S203). The reduction ratio determination unit 102 calculates the minimum reduction ratio to be applied to page p from the extracted smallest character size and the smallest character size set in step S105 (step S204). At this time, the reduction ratio is calculated such that the character size is not less than the predetermined size set in step S105 after the output of the image, which includes the smallest character in the page of interest. The reduction ratio determination unit 102 stores the calculated reduction ratio in S(p) (step S205).

The reduction ratio determination unit 102 increments p in order to calculate the minimum reduction ratio on the next page (step S206). The reduction ratio determination unit 102 judges whether or not p is greater than the total number of pages N of the received image data (step S207). If p is not greater than N, the process is returned to step S203 in order to calculate the reduction ratio of the next page. If p is greater than N, the process for calculating the minimum reduction ratio relating to all pages has been completed.

Figure 7A:
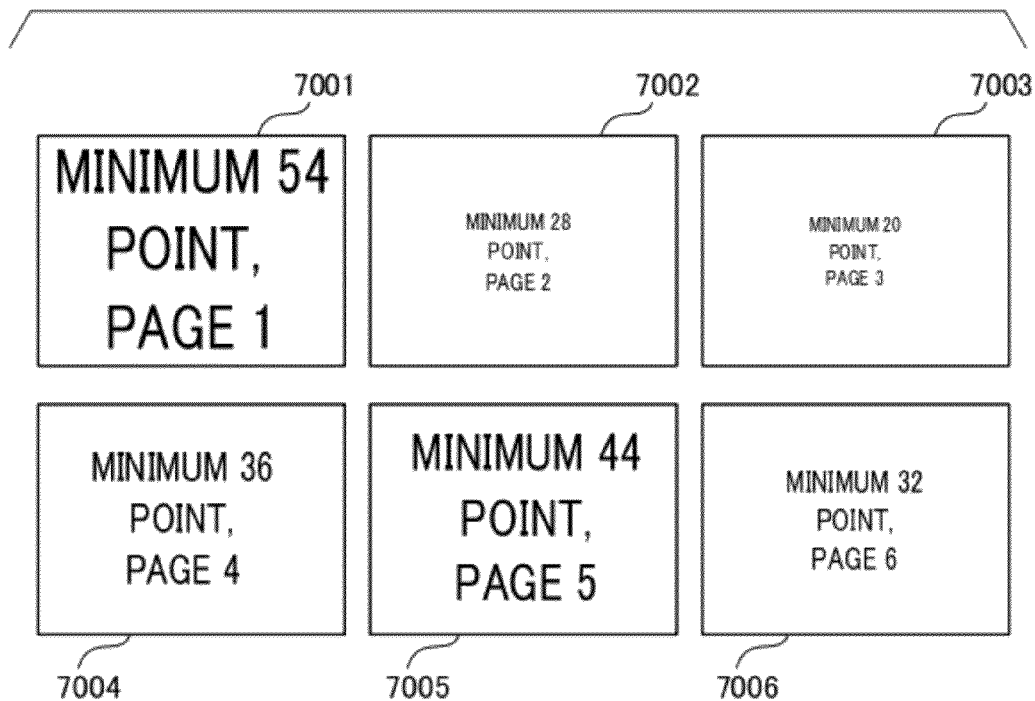
FIG. 7A is a view showing an image before processing according to the first to third embodiments.
Figure 7B:
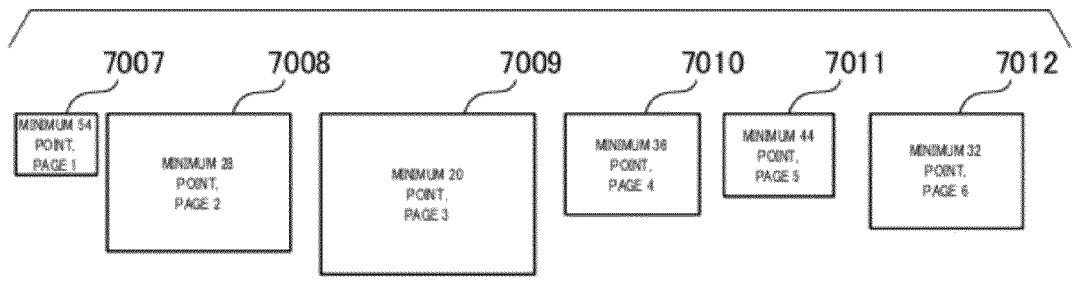
FIG. 7B is a view showing an image after reduction according to the first to third embodiments.

FIGS. 7A and 7B show a relationship between the received image data and the image data reduced in S(p). FIG. 7A shows the 1st to 6th pages (7001-7006), which include different character sizes. FIG. 7B shows the 1st to 6th pages (7007-7012) in the case of the reduction using a single reduction ratio S(p). In the first embodiment, the reduction ratio is calculated such that the size of the output character is greater than a predetermined size. More specifically, the reduction ratio is calculated such that the output character is not less than 10 point. Since the minimum point is set to 10 in the present application, the reduction ratio of the 1st page 7001 in FIG. 7A becomes 18.5%. By applying this reduction ratio to the 1st page 7001 in FIG. 7A, the 1st page 7007 in FIG. 7B can be obtained. Likewise, the reduction ratio of the 2nd page 7002 in FIG. 7A becomes 35.7%. By applying this reduction ratio to the 2nd page 7002 in FIG. 7A, the 2nd page 7008 in FIG. 7B can be obtained. Likewise, by calculating the reduction ratio of each of the 3rd page 7003 to the 6th page 7006 in FIG. 7A, the 3rd page 7009 to the 6th page 7012 in FIG. 7B can be obtained.

Referring back to FIG. 5, the reduction ratio determination unit 102 initializes a stored page counter k to 1 (step S208). The reduction ratio determination unit 102 initializes an image counter z to 1 (step S209). The reduction ratio determination unit 102 clears image storage buffers pic(1), pic(2), pic(3), and pic(4) (step S210). Next, the layout trial unit 104 and the layout determination unit 105 execute the layout determination trial process (step S211).

Figure 6:
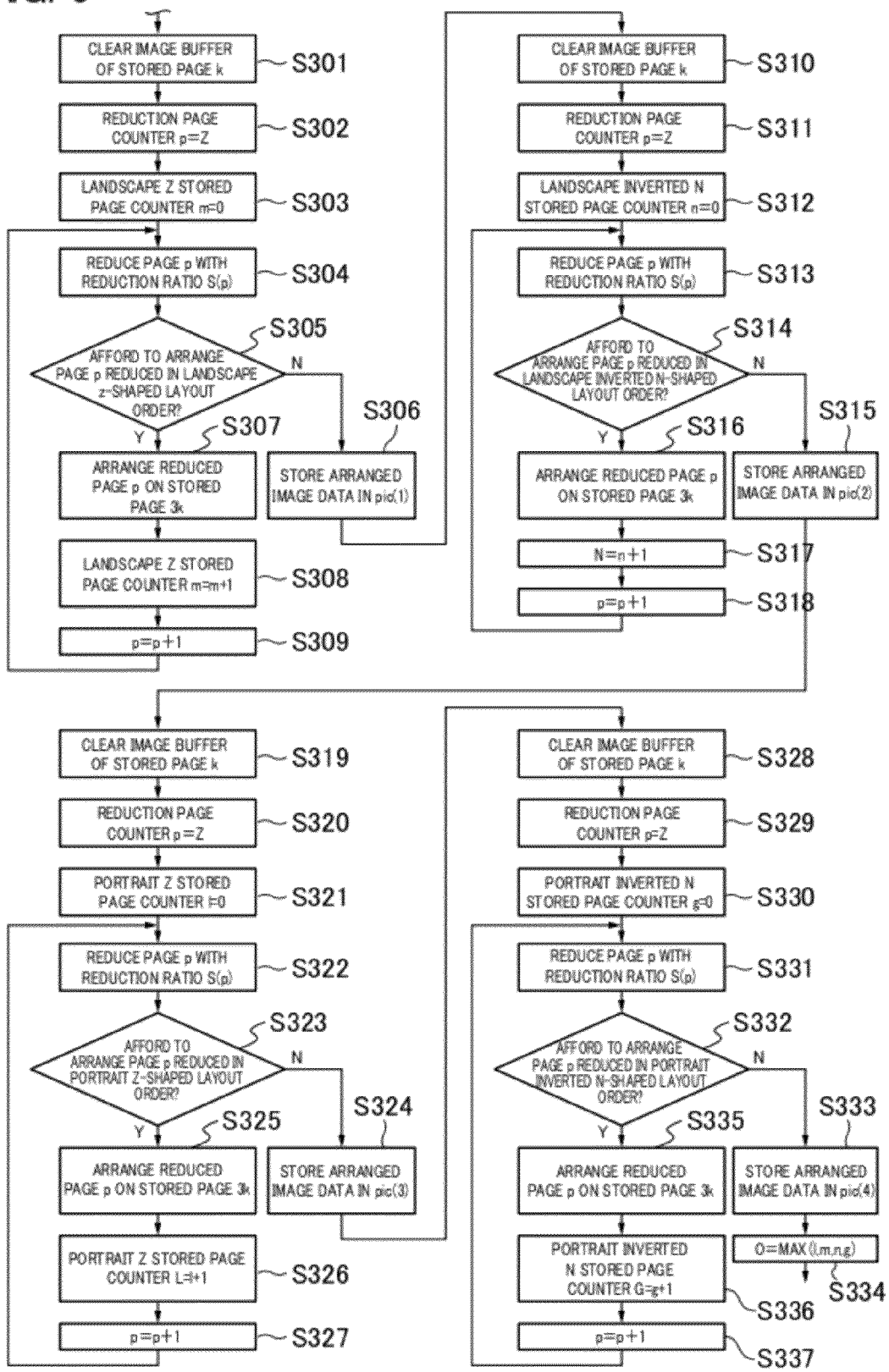
FIG. 6 is a flowchart showing the operation of the layout determination trial processing of the first to third embodiments.

FIG. 6 is a flowchart showing the layout determination trial process (S211) of the first embodiment.

First, the layout trial unit 104 clears the image storage buffer for the kth page of the stored pages (step S301). The layout trial unit 104 sets the image page counter z, which indicates a page, to start processing to the reduction page counter p (step S302). The layout trial unit 104 initializes the landscape Z-shaped layout stored page counter m to 0 (step S303). The layout trial unit 104 reduces the image data of page p with the reduction ratio S(p) (step S304).

Next, the layout trial unit 104 checks whether or not there is space for arranging page p, which has been reduced in accordance with the landscape Z-shaped layout order, in the image storage buffer for the kth page of the stored pages (step S305). The landscape Z-shaped layout order herein refers to a layout method in which, with an area set in a landscape orientation, the reduced image data are sequentially arranged in the left-to-right horizontal direction, and when the reduced image data cannot be arranged in the horizontal direction, the layout position is offset in the top-to-down vertical direction and the reduced image data are again sequentially arranged in the left-to-right horizontal direction.

When there is space for arranging the image data in step S305, the layout trial unit 104 arranges page p of the reduced image data in the image storage buffer for the kth page of the stored pages (step S307). The layout trial unit 104 increments the landscape Z-shaped layout stored page counter m (step S308). The layout trial unit 104 increments the reduction page counter p (step S309). Next, the flow returns to step S304. When there is no space in step S305, the layout trial unit 104 stores the content of the image storage buffer for the kth page of the stored pages in the pic (1) (step S306). By executing the processes from step S301 to step S309, a number of pages (value m) to be arranged on one face of a sheet in the landscape Z-shaped layout order can be specified. The value m is used in processes in FIG. 8 to be described later.

The layout trial unit 104 clears the image storage buffer for the kth page of the stored pages (step S310). The layout trial unit 104 sets the image page counter z which indicates a page to start processing to the reduction page counter p (step S311). The layout trial unit 104 initializes the landscape inverted N-shaped layout stored page counter n to 0 (step S312). The layout trial unit 104 reduces the image data of page p with the reduction ratio S(p) (step S313).

The layout trial unit 104 checks whether or not there is sufficient space for arranging page p, which has been reduced in accordance with the landscape inverted N-shaped layout order, in the image storage buffer for the kth page of the stored pages (step S314). The landscape inverted N-shaped layout order herein refers to a layout method in which, with an area set in a landscape orientation, the reduced image data are sequentially arranged in the top-to-down vertical direction, and when the reduced image data cannot be arranged in the vertical direction, the layout position is offset in the left-to-right horizontal direction and the reduced image data are again sequentially arranged in the top-to-down vertical direction.

When there is space for arranging the image data in step S314, the layout trial unit 104 arranges page p of the reduced image data in the image storage buffer for the kth page of the stored pages (step S316). The layout trial unit 104 increments the landscape inverted N-shaped layout stored page counter n (step S317). The layout trial unit 104 increments the reduction page counter p (step S318). Next, the flow returns to step S313. When there is no space in step S314, the layout trial unit 104 stores the content of the image storage buffer for the kth page of the stored pages in the pic (2) (step S315). By executing the processes from step S311 to step S315, the number of pages (value n) to be arranged on one face of a sheet in the landscape inverted N-shaped layout order can be specified. The value n is used in processes in FIG. 8 to be described later.

The layout trial unit 104 clears the image storage buffer for the kth page of the stored pages (step S319). The layout trial unit 104 sets the image page counter z which indicates a page to start processing to the reduction page counter p (step S320). The layout trial unit 104 initializes the portrait Z-shaped layout stored page counter l to 0 (step S321). The layout trial unit 104 reduces the image data of page p with the reduction ratio S(p) (step S322).

The layout trial unit 104 checks whether or not there is space for arranging page p, which has been reduced in accordance with the portrait Z-shaped layout order, in the image storage buffer for the kth page of the stored pages (step S323). The portrait Z-shaped layout order herein refers to a layout method in which, with an area set in a portrait orientation, the reduced image data are sequentially arranged in the left-to-right horizontal direction, and when the reduced image data cannot be arranged in the horizontal direction, the layout position is offset in the top-to-down vertical direction and the reduced image data are again sequentially arranged in the left-to-right horizontal direction.

When there is space for arranging the image data in step S323, the layout trial unit 104 arranges page p of the reduced image data in the image storage buffer for the kth page of the stored pages (step S325). The layout trial unit 104 increments the portrait Z-shaped layout stored page counter l (step S326). The layout trial unit 104 increments the reduction page counter p (step S327). Next, the flow returns to step S322. When there is no space in step S323, the layout trial unit 104 stores the content of the image storage buffer for the kth page of the stored pages in the pic (3) (step S324). By executing the processes from step S320 to step S327, the number of pages (value l) to be arranged on one face of a sheet in the portrait Z-shaped layout order can be specified. The value l is used in processes in FIG. 8 to be described later.

The layout trial unit 104 clears the image storage buffer for the kth page of the stored pages (step S328). The layout trial unit 104 sets the image page counter z, which indicates a page to start processing, to the reduction page counter p (step S329). The layout trial unit 104 initializes the portrait inverted N-shaped layout stored page counter g to 0 (step S330). The layout trial unit 104 reduces the image data of page p using the reduction ratio S(p) (step S331).

The layout trial unit 104 checks whether or not there is space for arranging page p, which has been reduced in accordance with the portrait inverted N-shaped layout order, in the image storage buffer for the kth page of the stored pages (step S332). The portrait inverted N-shaped layout order herein refers to a layout method in which, with an area set in a portrait orientation, the reduced image data are sequentially arranged in the top-to-down vertical direction, and when the reduced image data cannot be arranged in the vertical direction, the layout position is offset in the left-to-right horizontal direction and the reduced image data are again sequentially arranged in the top-to-down vertical direction.

When there is space for arranging the image data in step S332, the layout trial unit 104 arranges page p of the reduced image data in the image storage buffer for the kth page of the stored pages (step S335). The layout trial unit 104 increments the portrait inverted N-shaped layout stored page counter g (step S336). The layout trial unit 104 increments the reduction page counter p (step S337). Next, the flow returns to step S322. When there is no space in step S332, the layout trial unit 104 stores the content of the image storage buffer for the kth page of the stored pages in the pic (4) (step S333). By executing the processes from step S320 to step S333, the number of pages (value g) to be arranged on one face of a sheet in the portrait inverted N-shaped layout order can be specified. The value g is used in the processes in FIG. 8, which is to be described below.

Figure 9A:
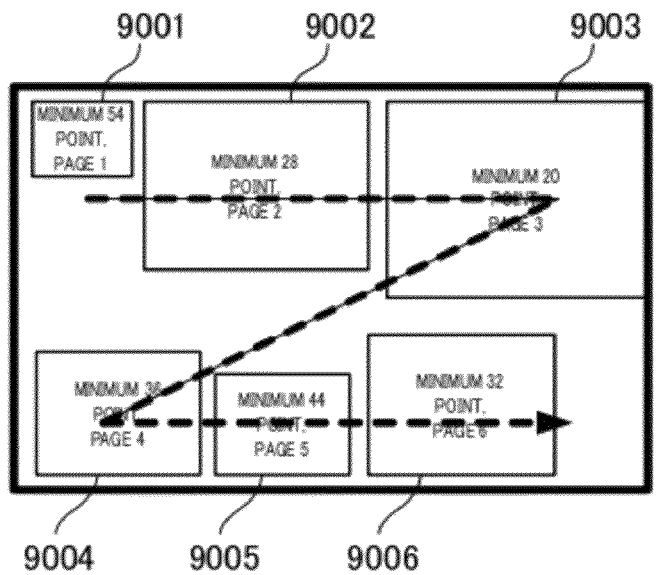
FIG. 9A is a view showing a landscape Z-shaped layout including 6 pages in the first to third embodiments.
Figure 9B:
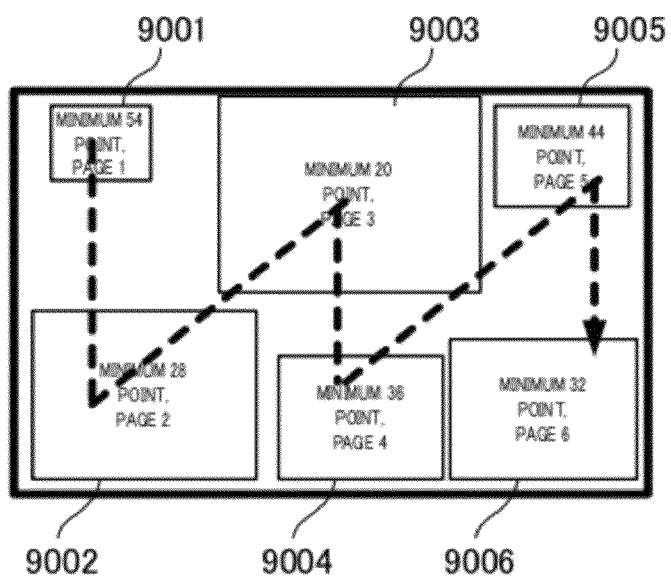
FIG. 9B is a view showing a landscape inverted N-shaped layout including 6 pages in the first to third embodiments.
Figure 9C:
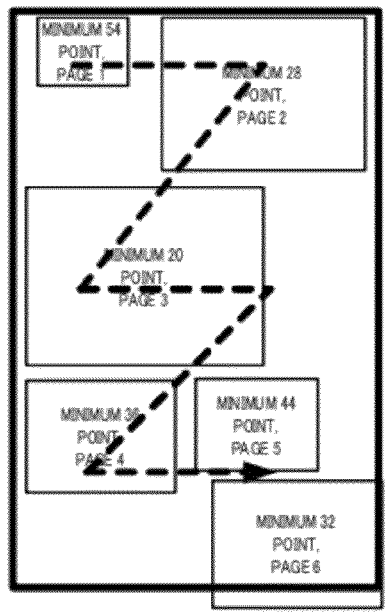
FIG. 9C is a view showing a portrait Z-shaped layout including 6 pages in the first to third embodiments.
Figure 9D:
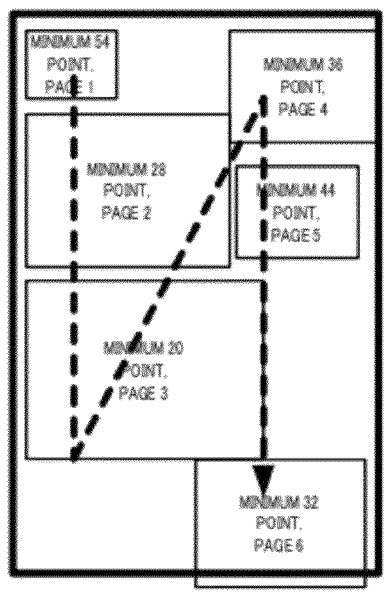
FIG. 9D is a view showing a portrait inverted N-shaped layout including 6 pages in the first to third embodiments.

FIGS. 9A, 9B, 9C, and 9D show four layout methods. FIG. 9A shows a landscape Z-shaped layout that includes 6 pages 9001-9006. FIG. 9B shows a landscape inverted N-shaped layout that includes 6 pages 9001-9006. FIG. 9C shows a portrait Z-shaped layout that includes 6 pages 9001-9006. FIG. 9D shows a portrait inverted N-shaped layout that includes 6 pages. In this manner, the difference between these methods is that the image data are each arranged in different directions.

The layout trial unit 104 examines the maximum values of m, n, l, and g for determining which layout can store the most pages, and sets the maximum value to o (step S334).

Figure 8:
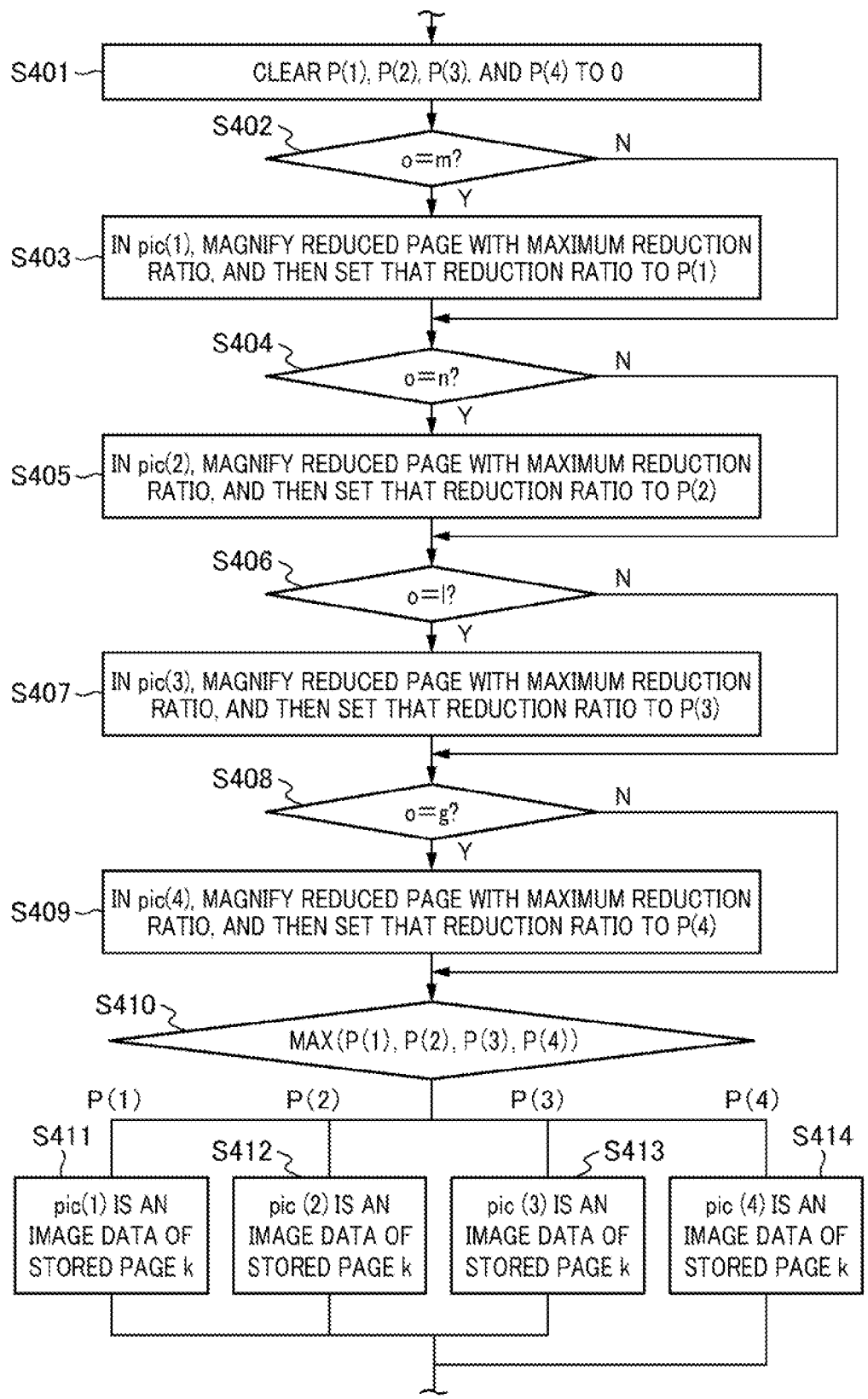
FIG. 8 is a flowchart showing the operation of the layout determination processing of the first to third embodiments.

FIG. 8 shows an example of the layout determination processing (S212) in the first embodiment.

First, the layout determination unit 105 clears P(1), P(2), P(3), P(4) to 0 (step S401). Then, o is compared with m for checking whether the landscape Z-shaped layout can store the maximum number of pages (step S402). If they are not the same, the layout determination unit 105 judges that the landscape Z-shaped layout cannot store the maximum number of pages, and advances to step S404. If they are the same, the layout determination unit 105 judges that the landscape Z-shaped layout can store the maximum number of pages, and determines the page with the minimum S(p) among the arranged pages. Then, the layout determination unit 105 judges from the content of pic(1) whether the page with the minimum S(p) can be magnified utilizing margins therearound. If the page can be magnified, the magnification unit 106 maximally magnifies the page, and stores the result to Pic(1). This magnification method will be described in detail with reference to FIG. 22. First, among the pages from z to z+o−1 to be stored on page p, the layout determination unit 105 sets the page number with the minimum reduction ratio to T (step S701). Next, among the pages from z to z+o−1 to be stored on the page p, the page number with the second smallest reduction ratio is set to U (step S702). The layout determination unit 105 checks whether the page T can be magnified with the reduction ratio from S(T) to S(U)+1 utilizing its margins (step S703).

If the page T cannot be magnified, the layout determination unit 105 magnifies the page T as large as possible utilizing its margins (step S704), and sets the resulting reduction ratio magnified to S(T) (step S705).

On the other hand, if the page is judged to be magnifiable in step S703, the layout determination unit 105 sets S(T) to S(U)+1 (step S706). The layout determination unit 105 magnifies page T utilizing its margins until the reduction ratio of page T becomes S(U)+1 (step S707). The processing is repeated until there is no margin.

A specific example of FIG. 22 will be described, hereinbelow. In FIG. 9B, the 1st page 9001 has the minimum reduction ratio (18.5%). The 5th page 9005 has the second smallest reduction ratio (22.7%). Hence, the layout determination unit 105 judges whether the 1st page 9001 can be magnified up to the reduction ratio of the 5th page 9005+1 (i.e., 23.7%) (S703). If the 1st page 9001 can be magnified, the reduction ratio of the 1st page 9001 is increased from 18.5% to 23.7%.

Next, since the layout determination unit 105 repeats the processing until there is no margin, the 5th page 9005 has the minimum reduction ratio (22.7%) and the second smallest reduction ratio becomes the reduction ratio (23.7%) of the 1st page 9001 after magnification. Hence, the layout determination unit judges whether the reduction ratio of the 5th page 9005 can be increased up to the reduction ratio of the 1st page 9001+1 (i.e., 24.7%) (S703). Repeating the above-described processing makes it possible to sequentially magnify pages from the page to which the smaller reduction ratio is applied.

Figure 10:
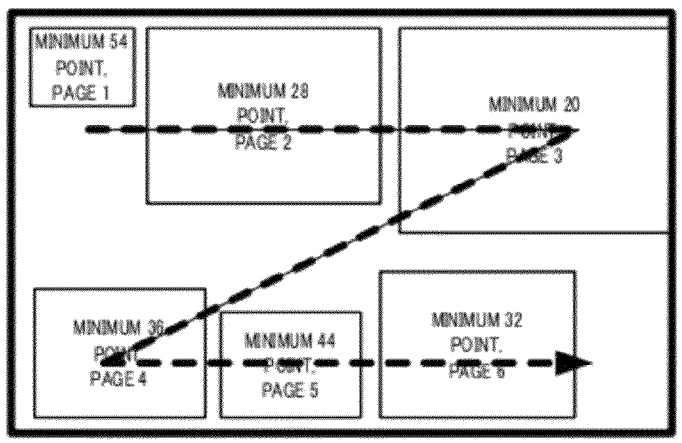
FIG. 10 is a view showing an example of a layout from which a page cannot be magnified in the first to third embodiments.
Figure 11A:
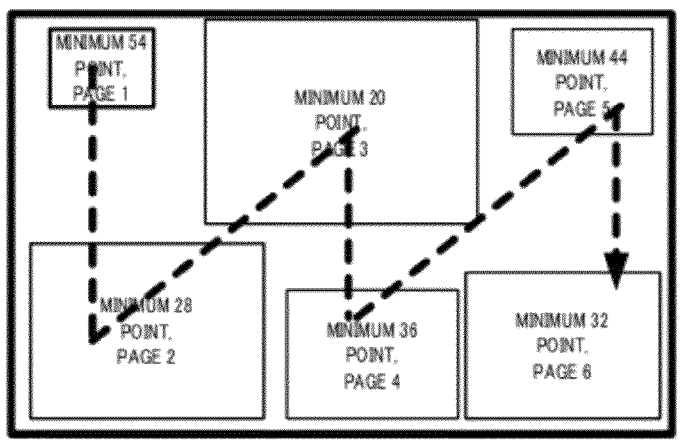
FIG. 11A is a view showing an example of a layout from which a page can be magnified in the first to third embodiments.
Figure 11B:
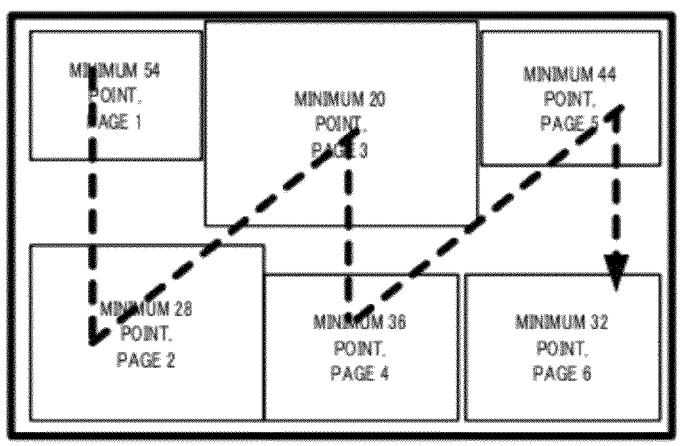
FIG. 11B is a view showing an example of a layout after the magnification of pages in the first to third embodiments.

FIG. 10 and FIG. 11 each shows a specific example of the layout determination processing. In FIG. 10, there is no margin around the most reduced page 1 for magnifying it, and thus page 1 cannot be magnified. In FIG. 11A (before magnification), there are margins around the most reduced page 1, and thus page 1 is ready for magnification. FIG. 11B shows an example of the page magnification. Not only page 1 but also pages other than page 1 are magnified as large as possible because of margins therearound.

Figure 22:
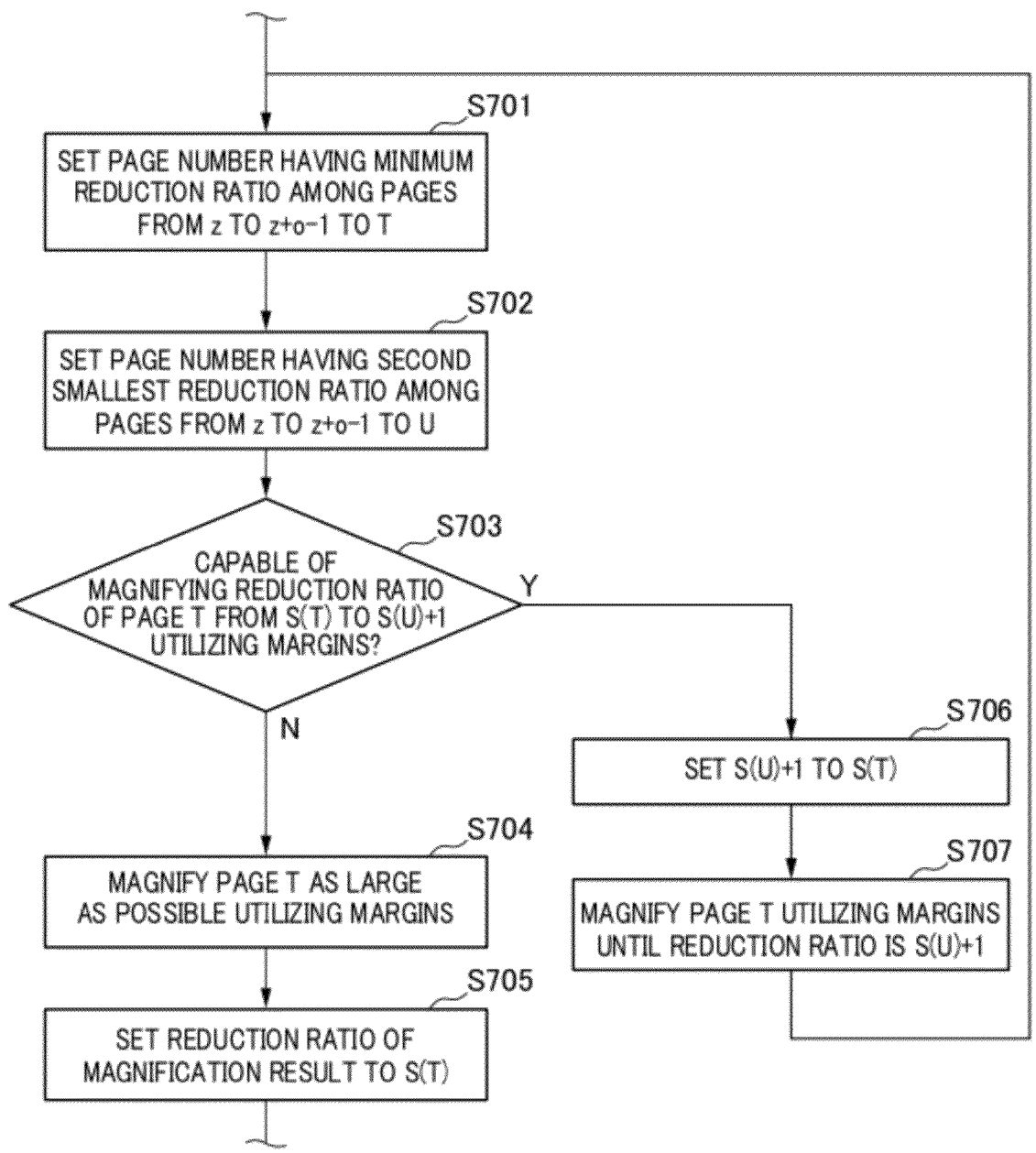
FIG. 22 is a flowchart showing the method of magnifying a page in the first to third embodiments.

As a result of magnification by executing the processing in FIG. 22, the magnification unit 106 stores the minimum value of the reduction ratio of all changed pages to P(1) (step S403).

The layout determination unit 105 compares o with n for checking whether the landscape inverted N-shaped layout can store the maximum number of pages (step S404). If they are not the same, the layout determination unit 105 judges that the landscape inverted N-shaped layout cannot store the maximum number of pages, and advances to step S407. If they are the same, the layout determination unit 105 judges that the landscape inverted N-shaped layout can store the maximum number of pages, and determines the page with the minimum S(p) among the arranged and reduced pages. Then, the layout determination unit 105 judges from the content of pic(2) whether the page with the minimum S(p) can be magnified utilizing margins therearound. As this judgment unit is the processing in FIG. 22 and its detailed description has been given above, no further description will be given here. If the page can be magnified, the magnification unit 106 maximally magnifies the page, and stores the result to Pic(2).

The magnification unit 106 stores the minimum value of the reduction ratio of all pages thus changed as a result of magnification to P(2) (step S405).

The layout determination unit 105 compares o with l for checking whether the portrait Z-shaped layout can store the maximum number of pages (step S406). If they are not the same, the layout determination unit 105 judges that the portrait Z-shaped layout cannot store the maximum number of pages, and advances to step S408. If they are the same, the layout determination unit 105 judges that the portrait Z-shaped layout can store the maximum number of pages, and determines the page with the minimum S(p) among the arranged and reduced pages. Then, the layout determination unit 105 judges from the content of pic(3) whether the page with the minimum S(p) can be magnified utilizing margins therearound. As this judgment unit is the processing in FIG. 22 and its detailed description has already been given above, no further description will be given here. If the page can be magnified, the magnification unit 106 maximally magnifies the page, and stores the result to Pic(3).

The magnification unit 106 stores the minimum value of the reduction ratio of all pages thus changed as a result of magnification to P(3) (step S407).

The layout determination unit 105 compares o with g for checking whether the portrait inverted N-shaped layout can store the maximum number of pages (step S408). If they are not the same, the layout determination unit 105 judges that the portrait inverted N-shaped layout cannot store the maximum number of pages, and advances to step S410. If they are the same, the layout determination unit 105 judges that the portrait inverted N-shaped layout can store the maximum number of pages, and determines the page with the minimum S(p) among the arranged and reduced pages. Then, the layout determination unit 105 judges from the content of pic(4) whether the page with the minimum S(p) can be magnified utilizing margins therearound. As this judgment unit is the processing in FIG. 22 and its detailed description has already been given above, no further description will be given here. If the page can be magnified, the magnification unit 106 maximally magnifies the page, and stores the result to Pic(4).

The magnification unit 106 stores the minimum value of the reduction ratio of all pages thus changed as a result of magnification to P(4) (step S409).

Next, the layout determination unit 105 determines the maximum values of P(1), P(2), P(3), and P(4) (step S410). If the maximum value among P(1), P(2), P(3), and P(4) is P(1), the image content of pic(1) is determined to be the content of the image data of stored page k (step S411). If the maximum value among P(1), P(2), P(3), and P(4) is P(2), the layout determination unit 105 determines that the image content of pic(2) is the content of the image data of stored page k (step S412). If the maximum value among P(1), P(2), P(3), and P(4) is P(3), the layout determination unit 105 determines that the image content of pic(3) is the content of the image data of stored page k (step S413). If the maximum value among P(1), P(2), P(3), and P(4) is P(4), the layout determination unit 105 determines that the image content of pic(4) is the content of the image data of stored page k (step S414).

Referring back to FIG. 5, a margin reducing module 110 transmits the image data of stored page k that has been determined (step S213). The reduction ratio determination unit 102 increments the stored page counter k (step S214). The reduction ratio determination unit 102 increments the image page counter z by the processed o pages (step S215). The reduction ratio determination unit 102 checks whether all pages have been processed by comparing z with the page N of the image data (step S216). If they are different, the reduction ratio determination unit 102 judges that there exist pages to be processed and performs step S210. If they are the same, the reduction ratio determination unit 102 judges that all pages have been processed and finishes the processing (step S217).

According to the first embodiment, the following effects are provided. The first embodiment of the present invention can reduce the quantity to be printed while setting the character size at a readable level. In addition, the first embodiment of the present invention magnifies a page that has been set up with the minimum reduction ratio, whereby the first embodiment of the present invention can improve readability even in the case where a figure(s) is included in the page.

A second embodiment is an example wherein the present invention is applied to an application for treating a plurality of pages of various files together as a single page.

Figure 12:
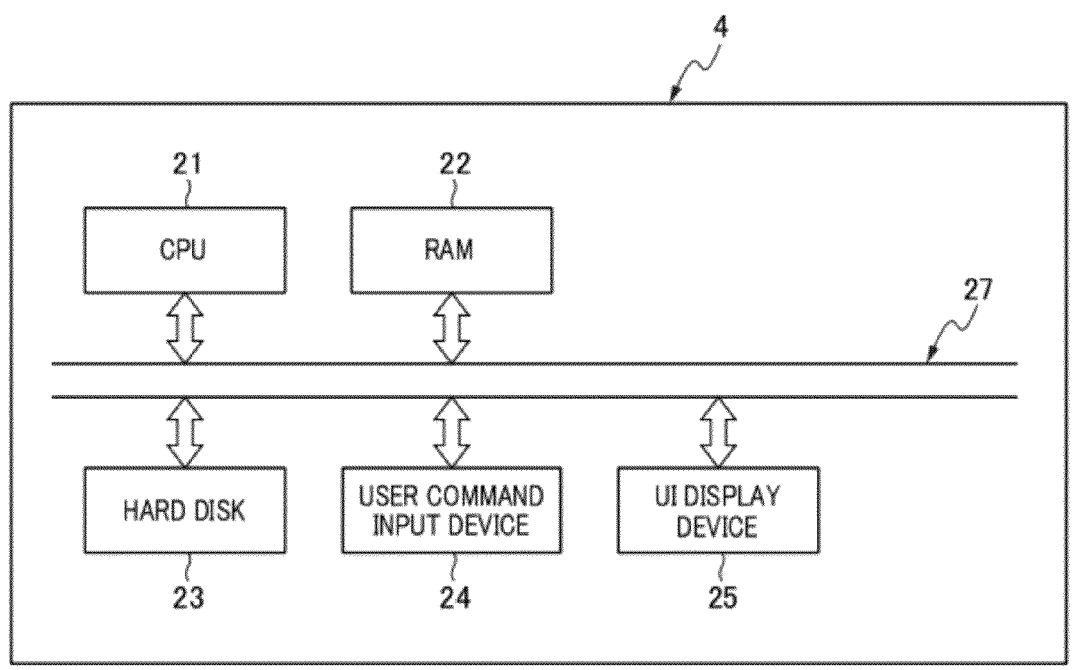
FIG. 12 is a view showing an internal block structure of a device for executing the application of the second embodiment.

FIG. 12 shows an internal block structure of an electronic device 4 according to the second embodiment. The electronic device 4 has the same construction as that of the personal computer 1 shown in FIG. 2 but without a communication device for communicating with an external printer.

The electronic device 4 includes a CPU 21, a RAM 22, a hard disk (hereinafter referred to as "HDD") 23, a user command input device 24, an UI display device 25, and a main bus 27 connecting these components together. As the function of each component of the electronic device 4 is similar to that of each component of the personal computer 1 shown in FIG. 2, no detailed description will be given here.

Figure 13:
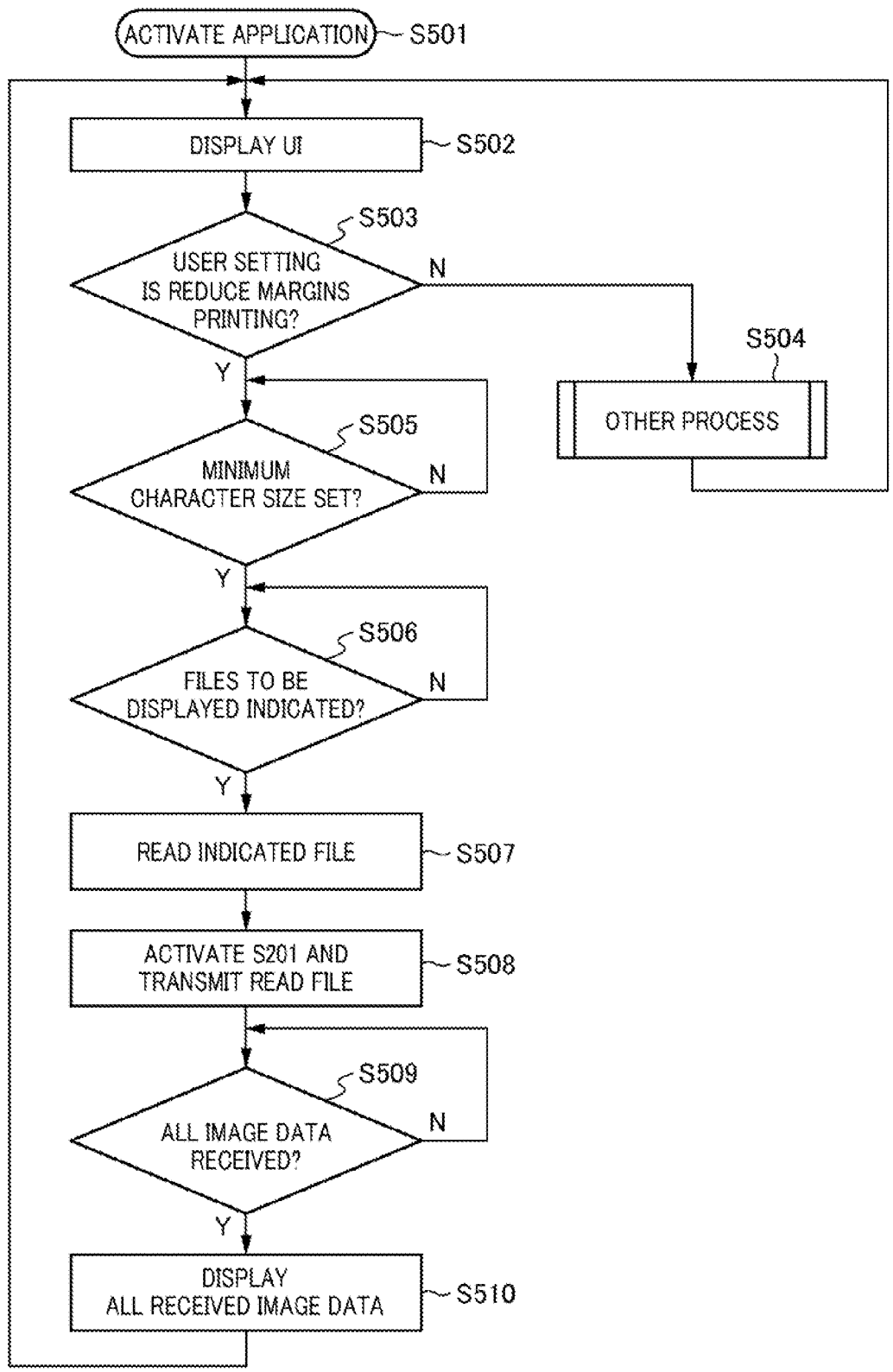
FIG. 13 is a flowchart showing the operation of the application implementing the second embodiment.

In the second embodiment, the CPU 21 loads an application from the HDD 23 to the RAM 22 to execute the flowchart of FIG. 13. As the structure of the application to be executed is similar to that of the structure shown in FIG. 2, no detailed description will be given here.

FIG. 13 is a flowchart showing the operation of the application to which the present invention is applied.

Figure 14:
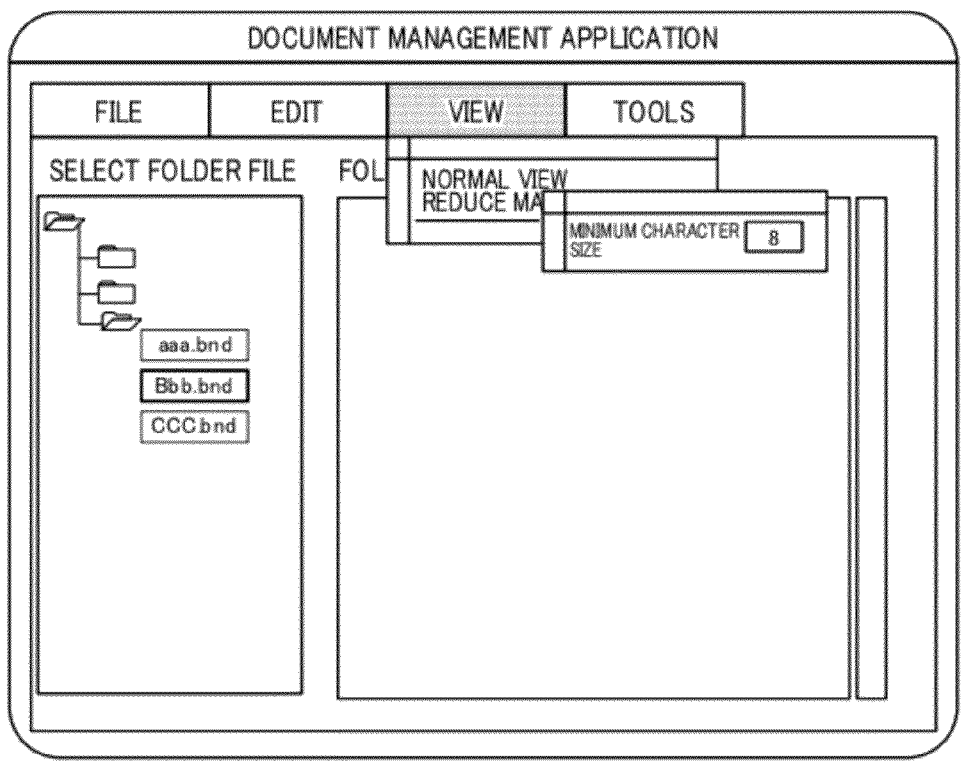
FIG. 14 is a view showing an example of a UI screen on the display settings in the application of the second embodiment.

The application is activated (step S501) and the output setting section 101 displays a screen for setting a normal view and a margin-reduced view as shown in FIG. 14 to the UI display device 25 (step S502). In FIG. 14, the normal view and the margin-reduced view are mutually exclusive settings.

The output setting section 101 judges whether the user setting input from the user command input device 24 is the margin-reduced view (step S503). If the user setting is not the margin-reduced view, the application performs the other display process (step S504). If the user setting is the margin-reduced view, the output setting section 101 waits for the smallest character size to be input from the user command input device 24 (step S505). When the user inputs the smallest character size, the output setting section 101 waits for a binder file including a plurality of compiled files of various types to be specified from the user command input device 24 (step S506). When the user specifies the binder file, the output setting section 101 reads out various types of specified files from the hard disk 23 (step S507). Next, the margin reducing module is activated and the file data read out together with the input smallest character size is passed to the output processing section 130 (step S508).

Figure 18:
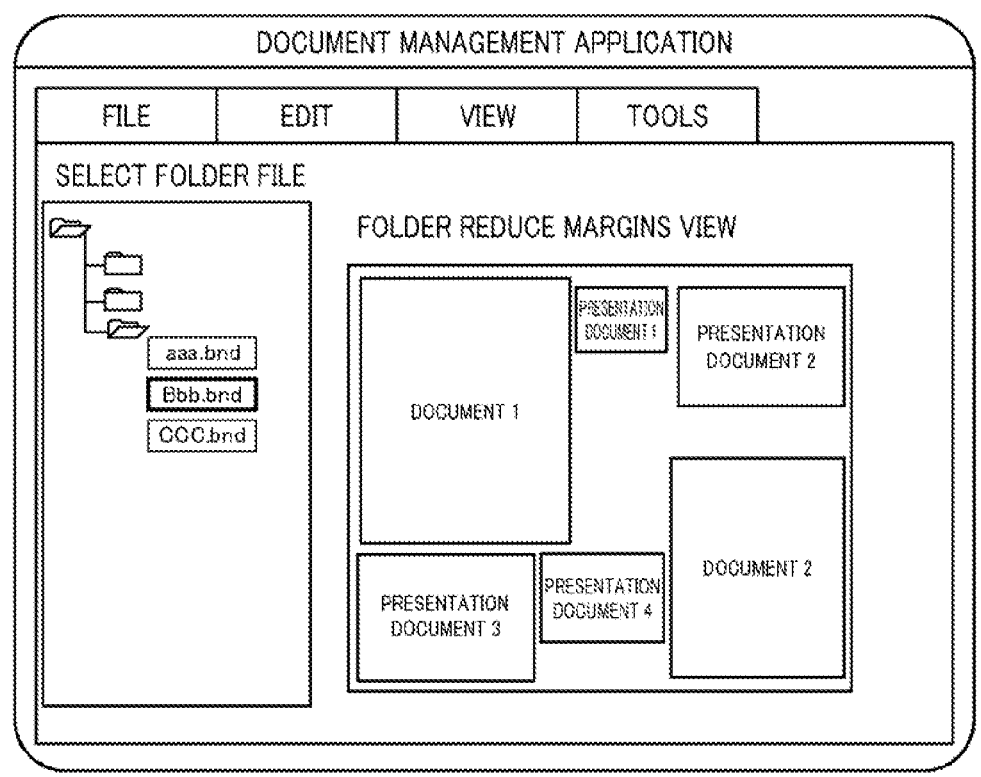
FIG. 18 is a view showing an example of a display of a plurality of files in the application of the second embodiment.

The operation of the thread for performing the margin reducing processing is the same as that of the first embodiment shown in FIG. 5. The output processing section 130 waits to receive the image data, which has been subjected to the margin reducing processing, for all pages (step S509). If the output processing section 130 receives the image data, which has been subjected to the margin reducing processing, for all pages, the output processing section 130 displays the received image data on the display device 25 (step S510). FIG. 18 is the result of this margin reducing processing.

Figure 15:
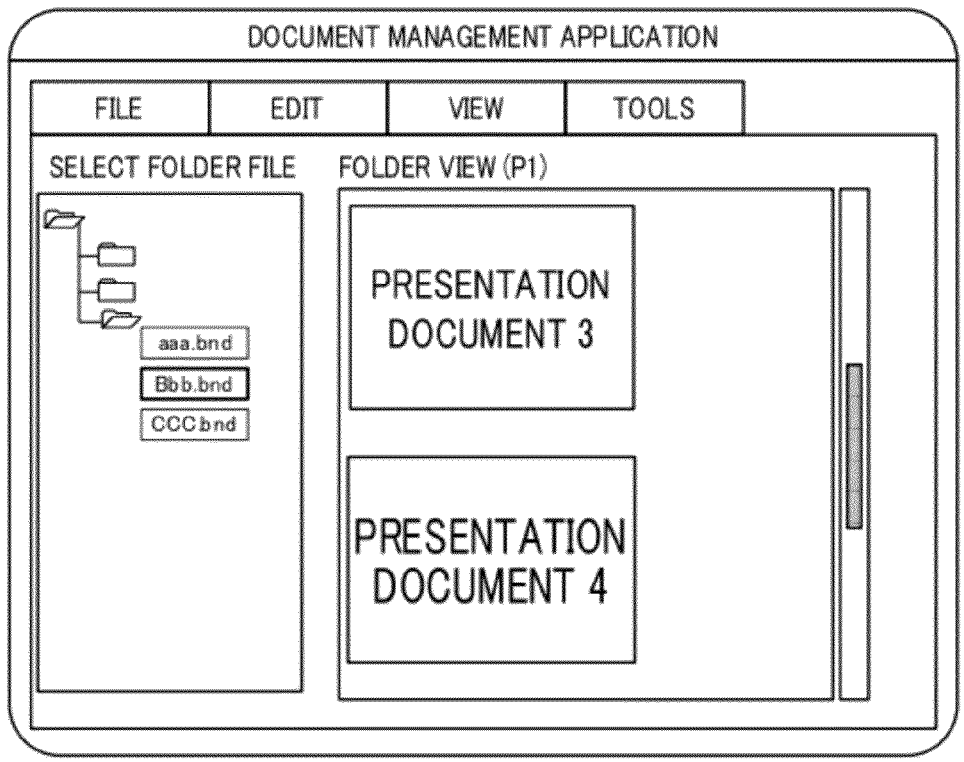
FIG. 15 is a view showing an example of a display of a plurality of files in the conventional application.
Figure 16:
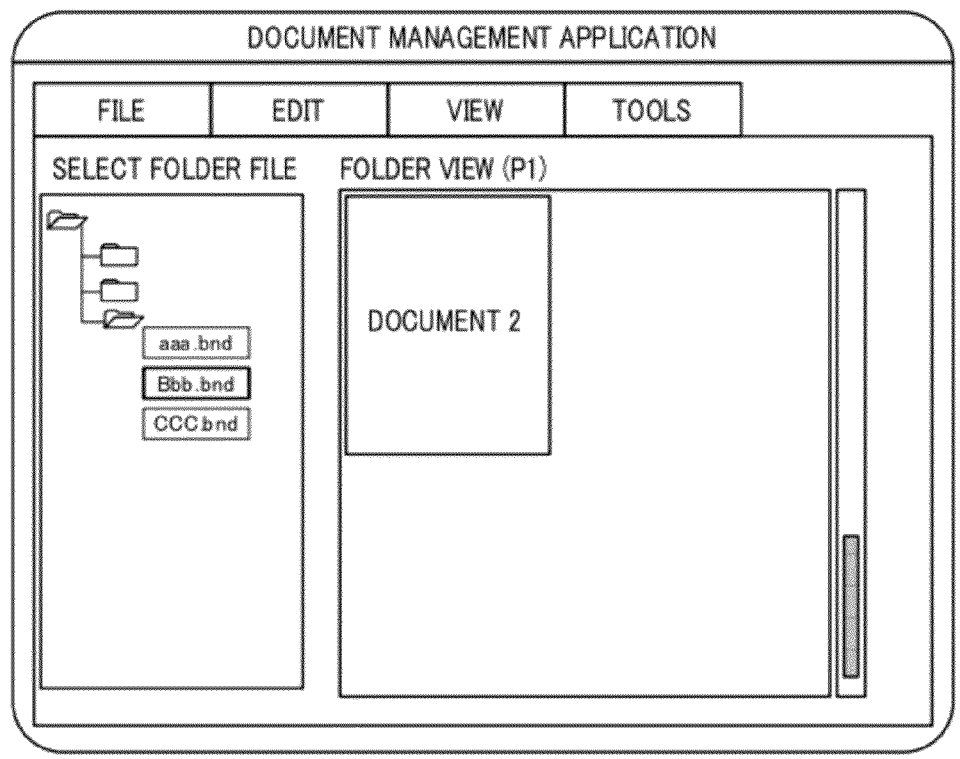
FIG. 16 is a view showing an example of a display of a plurality of files in the conventional application.
Figure 17:
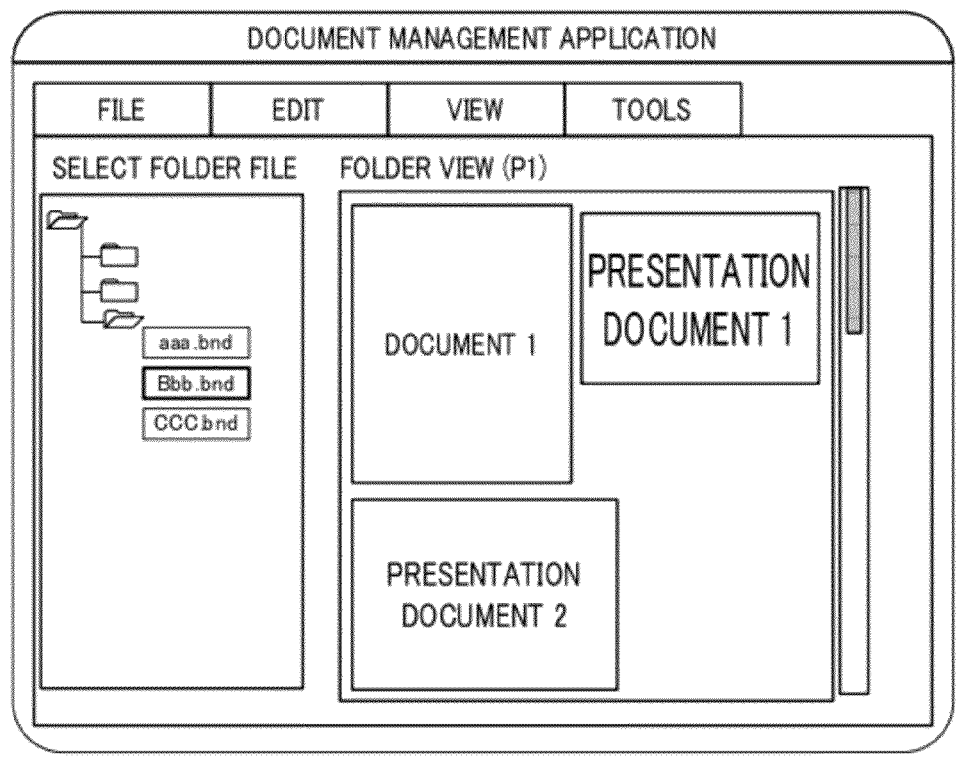
FIG. 17 is a view showing an example of a display of a plurality of files in the conventional application.

FIGS. 15, 16, and 17 each shows an example of the display of a plurality of presentation documents according to the normal view. For example, in the case of four presentation slides having a large character size and two documents having a small character size, two slides are displayed on the first page (FIG. 15), one document is displayed on the next page (FIG. 16), and two slides and one document are displayed on the last page (FIG. 17). These files are displayed with a preset reduction ratio.

FIG. 18 shows an example of the display of a plurality of presentation documents according to the present invention. In this example, each file is reduced by a different reduction ratio and the maximum number of pages is stored on a single page display area (predetermined area). For example, in the case of four pages of presentation slides having a large character size and two pages of documents having a small character size, six pages are stored on a single page. In the second embodiment, the character size is set larger than the readable smallest character size.

According to the second embodiment, many more pages can be displayed on a single screen while setting the character size at a readable level.

The third embodiment is an example wherein the present invention is applied to a copying device 5.

Figure 19:
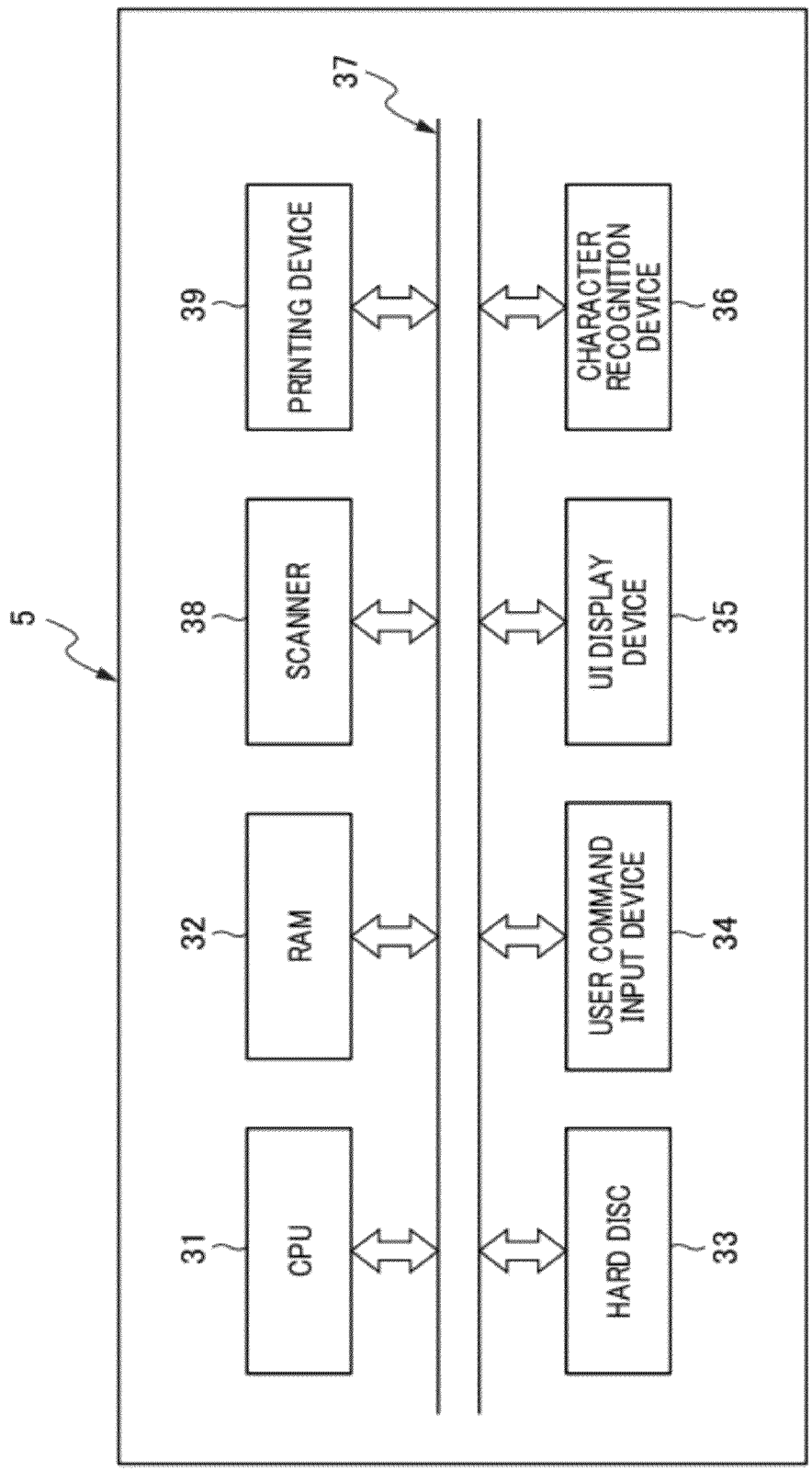
FIG. 19 is a view showing an internal block structure of the copying device of the third embodiment.

FIG. 19 shows an internal block structure of the copying device 5 of the third embodiment. The copying device 5 has the same construction as that of the personal computer 1 shown in FIG. 1 with the exception that a communication device for communicating with an external printer is not provided. The copying device 5 also includes a scanner 38, a printing device 39, and a character recognition device 36.

The copying device 5 includes a CPU 31, a RAM 32, a hard disk (hereinafter referred to as "HDD") 33, a user command input device 34, the UI display device 35, the scanner 38, the printing device 39, the character recognition device 36, and a main bus 37. As the function of each component of the copying device 5 is similar to that of each component of the personal computer 1 shown in FIG. 2, no detailed description will be given here.

The character recognition device 36 extracts characters from image data. The scanner 38 reads the original paper documents to produce image data. The printing device 39 performs printing.

Figure 20:
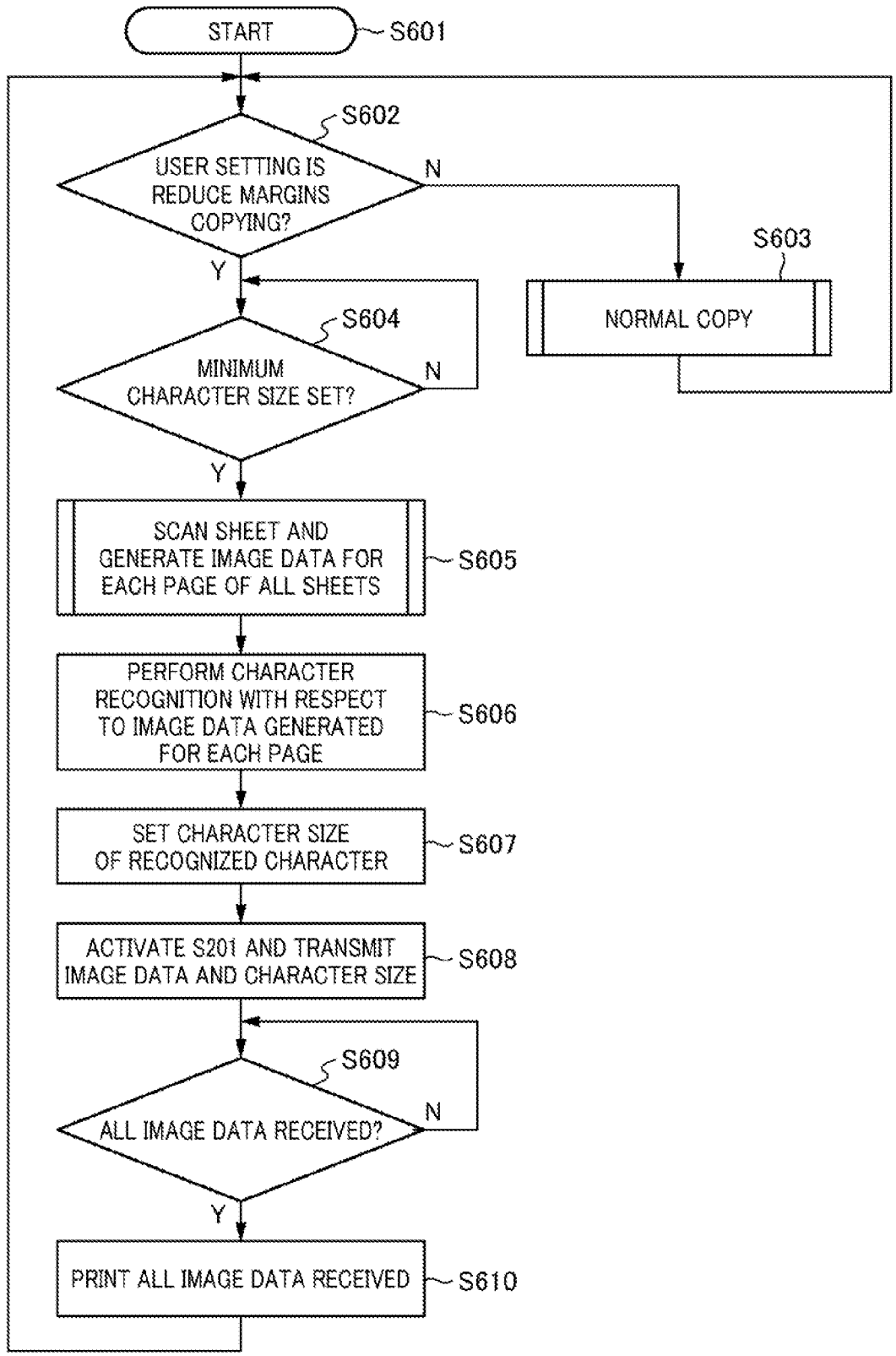
FIG. 20 is a flowchart showing the operation of the copying device implementing the third embodiment.

In the third embodiment, the CPU 31 loads an application from the HDD 33 to the RAM 32 to execute the flowchart of FIG. 20. As the structure of the application to be executed is similar to that of the structure shown in FIG. 2, no detailed description will be given here.

FIG. 20 shows the operation of the copying device 5 according to the third embodiment.

Figure 21:
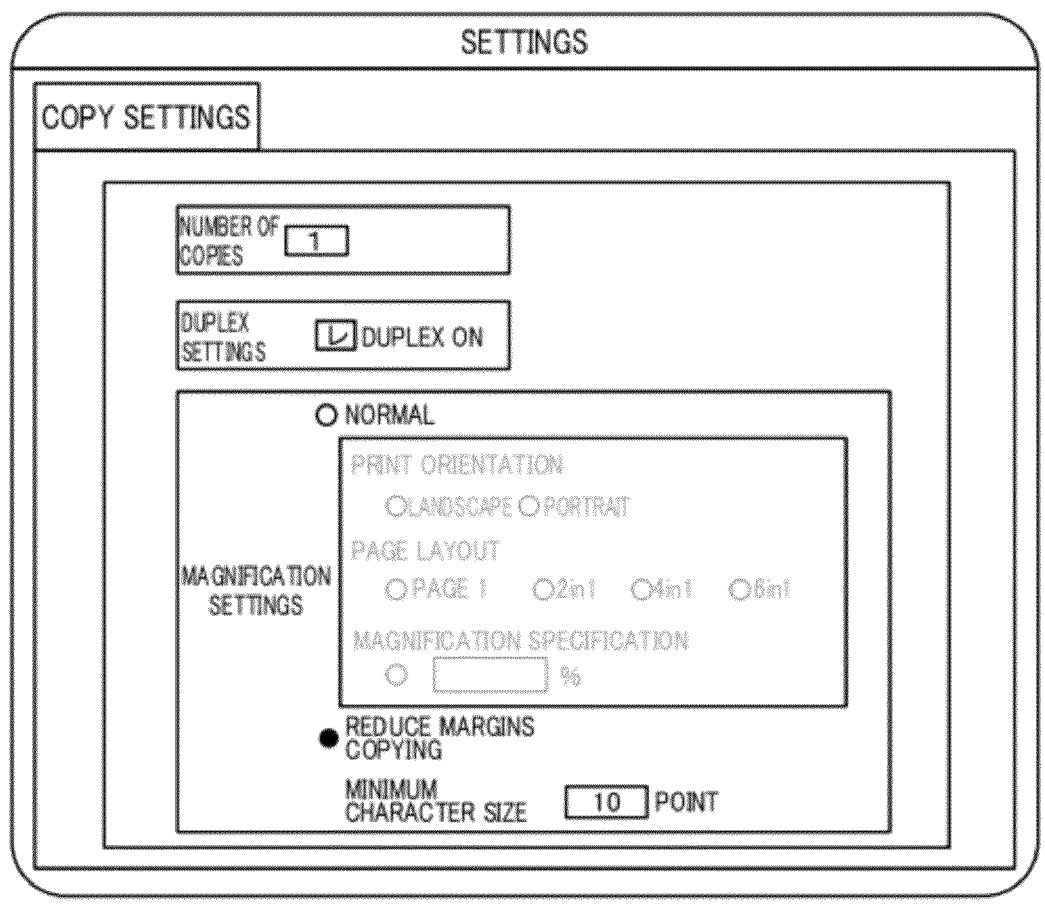
FIG. 21 is a view showing an example of a UI screen on the copy settings in the copying device of the third embodiment.

The copying device 5 is activated (step S601) and the output setting section 101 displays a screen for performing copy settings as shown in FIG. 21 on the UI display device 35. In this setup screen, normal copy magnification settings and margin-reduced copy settings are mutually exclusive settings.

As used herein, "margin reducing" refers to an approach which reduces a plurality of images (pages in the first embodiment) utilizing the margins of a sheet and successfully arranges them on a single sheet. As used herein, "margin-reduced copy" refers to copying an image after completion of the margin reducing processing.

The output setting section 101 judges whether the user setting input from the user command input device 34 is the margin-reduced copy (step S602). If the user setting is not the margin-reduced copy, a copying device 5 performs another normal copy process (step S603). If the user setting is the margin-reduced copy, the output setting section 101 waits for the smallest character size to be input from the user command input device 34 (step S604). When the user inputs the smallest character size, the copying device 5 scans all of the original paper documents using the scanner 38 and produces per-page image data (step S605).

The character recognition device 36 executes character recognition on the generated per-page image data (step S606). The character recognition device 36 determines the recognized character's size on the basis of the character image size in the image data, associates the size with each character, and stores the result in the image data (step S607). A thread for margin reducing is activated, and the margin reducing module 110 passes all of the image data together with the input smallest character size to the output processing section 130 (step S608).

The operation of the thread for performing the margin reducing processing is the same as that of the first embodiment shown in FIG. 5. The output processing section 130 waits to receive the image data, which has been subjected to the margin reducing processing, for all pages (step 609). If the output processing section 130 receives the image data, which has been subjected to the margin reducing processing, for all pages, all of the received image data are printed in a specified manner (duplex/simplex) in the quantity specified by a printing device 39 (step 610).

In the third embodiment, when a copy of the original paper documents is executed, the reduction ratio for each of the original paper documents is set in accordance with the character size for each of the original paper documents. Then, a plurality of the original paper documents are arranged on a single sheet of paper for printing.

According to the third embodiment of the present invention, many more pages can be printed on a single sheet of paper (predetermined area) while setting the character size at a readable level. In addition, the present invention can reduce the quantity to be copied and provide a legible copy particularly in the case where a figure(s) is included because of the magnification of the original paper documents with the minimum reduction ratio.

In the first to third embodiments, the four layout methods, i.e., the landscape Z-shaped layout method, the landscape inverted N-shaped layout method, the portrait Z-shaped layout method, and the portrait inverted N-shaped layout method, were described. However, the present invention is not limited thereto, but may be any other layout method or may be selected from many more layout methods or fewer layout methods.

Accordingly, aspects of the present invention provide a technique to reduce the number of printouts while setting a character size at a readable level. In particular, a printer to which the present invention is applied can reduce the number of printouts and thereby make them lighter for ease of carrying. An application of software to which the present invention is applied can enhance the operability because more images are displayed on a screen.

In the first to third embodiments, an image output apparatus was applied to a printer, an application, and a copying device. However, the present invention is not limited thereto, but may be applicable to any other device as long as the device reduces a plurality of images and displays them in a predetermined area.

The information processing device or the information processing method of the present invention can be realized by recording a computer program which realizes the information processing device or the information processing method onto a computer-readable storage (recording) medium, and causing each of the computers to read the computer program recorded onto the storage medium for execution. That is, the computer-readable storage medium having computer-executable instructions stored thereon for causing an image output apparatus to perform an image processing method is included in the present invention.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-169522 filed Jun. 27, 2008 which are hereby incorporated by reference herein it their entirety.

What is claimed is:

1. An apparatus comprising:
a reduction ratio determination unit that determines a reduction ratio in each of a plurality of image data based on a character size included in each of the plurality of image data;
a reduction unit that reduces each of the plurality of image data according to the respective reduction ratio;
a layout trial unit that arranges the plurality of reduced image data in a predetermined area according to a first layout method and arranges the plurality of reduced image data in the predetermined area according to a second layout method different from the first layout method;
a comparing unit that compares a number of image data that is arranged in the predetermined area according to the first layout method with a number of image data that is arranged in the predetermined area according to the second layout method; and
a layout determination unit that determines the first layout method in a case where the number of image data that is arranged in the predetermined area according to the first layout method is greater than the number of image data that is arranged in the predetermined area according to the second layout method, and determines the second layout method in a case where the number of image data that is arranged in the predetermined area according to the second layout method is greater than the number of image data that is arranged in the predetermined area according to the first layout method.

2. The apparatus according to claim 1, wherein the reduction ratio determination unit determines a reduction ratio from a smallest character size included in the image data such that the character to be output is not less than a predetermined size.

3. The apparatus according to claim 1, wherein the determined layout method enables a laying out of most image data in the predetermined area.

4. The apparatus according to claim 1, further comprising a magnification unit that magnifies the plurality of reduced image data that has been arranged.

5. The apparatus according to claim 4, wherein the layout determination unit determines a layout method from the first and the second layout methods using a magnification result, when the number of image data to be arranged in the predetermined area in accordance with an application of the first layout method is the same as the number of image data to be arranged in the predetermined area in accordance with an application of the second layout method.

6. The apparatus according to claim 1, wherein the first and the second layout methods arrange the plurality of image data in directions different from each other.

7. The apparatus according to claim 1, further comprising an output unit for outputting the plurality of image data arranged by the determined layout method.

8. A computer-readable storage medium having computer-executable instructions stored thereon for causing an apparatus to perform an image processing method, the computer-readable storage medium comprising:
computer-executable instructions for determining a reduction ratio in each of a plurality of image data based on a character size included in each of the plurality of image data;
computer-executable instructions for reducing each of the plurality of image data according to the respective reduction ratio;
computer-executable instructions for arranging the plurality of reduced image data in a predetermined area according to a first layout method and arranging the plurality of reduced image data in the predetermined area according to a second layout method different from the first layout method;
computer-executable instructions for comparing a number of image data that is arranged in the predetermined area according to the first layout method with a number of image data that is arranged in the predetermined area according to the second layout method; and
computer-executable instructions for determining the first layout method in a case where the number of image data that is arranged in the predetermined area according to the first layout method is greater than the number of image data that is arranged in the predetermined area according to the second layout method, and determining the second layout method in a case where the number of image data that is arranged in the predetermined area according to the second layout method is greater than the number of image data that is arranged in the predetermined area according to the first layout method.

9. A method implemented by computer-executable instructions for causing an apparatus to perform an image processing method comprising:
determining a reduction ratio in each of a plurality of image data based on a character size included in each of the plurality of image data;
reducing each of the plurality of image data according to the respective reduction ratio;
arranging the plurality of reduced image data in a predetermined area according to a first layout method;
arranging the plurality of reduced image data in the predetermined area according to a second layout method different from the first layout method;
comparing a number of image data that is arranged in the predetermined area according to the first layout method with a number of image data that is arranged in the predetermined area according to the second layout method;
determining the first layout method in a case where the number of image data that is arranged in the predetermined area according to the first layout method is greater than the number of image data that is arranged in the predetermined area according to the second layout method; and
determining the second layout method in a case where the number of image data that is arranged in the predetermined area according to the second layout method is greater than the number of image data that is arranged in the predetermined area according to the first layout method.

* * * * *